United States Patent Office 3,163,632
Patented Dec. 29, 1964

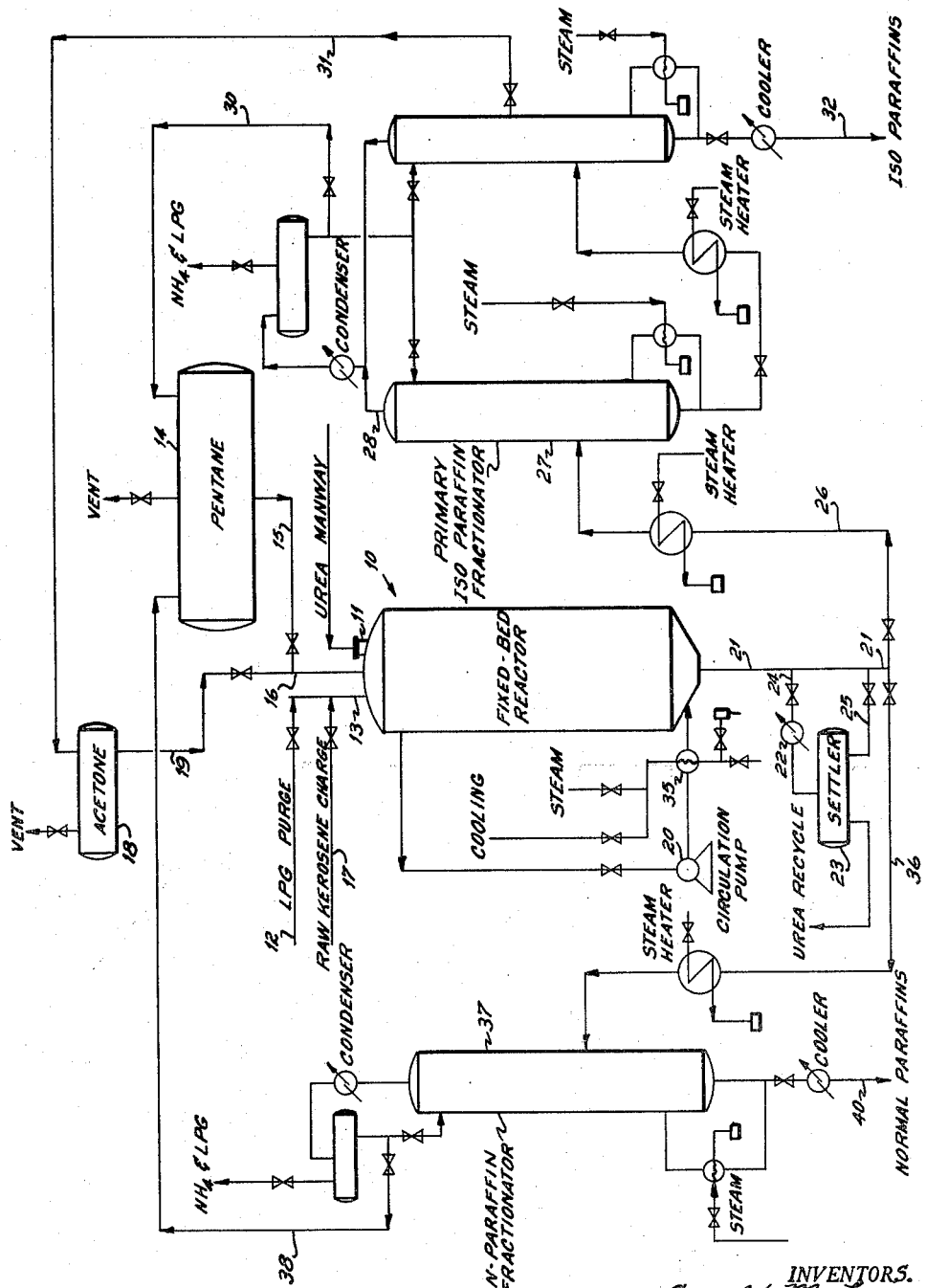

3,163,632
PROCESS FOR THE SEPARATION OF
N-PARAFFINS
Arnold M. Leas and Edward A. Thompson, both of Ashland, Ky., assignors to Ashland Oil & Refining Company, Ashland, Ky., a corporation of Kentucky
Filed June 2, 1961, Ser. No. 114,387
5 Claims. (Cl. 260—96.5)

This invention relates to a process for separating or extracting normal or straight chain paraffins from hydrocarbon mixtures in which they are present. More specifically, the invention relates to an improved process for separating n-paraffins which is based upon the formation of urea adducts.

It is well known in the petroleum refining art that certain organic agents, typified by urea, have the peculiar ability to form decomposable complexes with straight chain or unbranched hydrocarbons, but do not, generally speaking, combine with the other types of hydrocarbons with which straight chain hydrocarbons are usually admixed. When urea is contacted under appropriate conditions with a hydrocarbon mixture, the straight chain components of the mixture, if any, react with the urea to form masses known as adducts which can be separated from the other components of the mixture. These complexes can thereafter be decomposed to yield their urea and n-paraffin components, which can in turn be separated from each other. This basic technique is of wide potential applicability as a means of separating n-paraffins.

While the basic concept of adduct separation is thus simply stated, commercial processes based upon it have encountered significant technical difficulties in actual practice which have made commercial applications of the basic technique more complicated than might at first be expected.

One of the most difficult problems encountered in actual practice has proved to be the physical separation of the adducts, once formed, from the unreacted hydrocarbons and/or other liquids with which they are intimately mixed. In many past techniques, the adducts have been slushy or semi-solids, on which account they could not economically be separated from the liquids with which they were in admixture. Because the adducts are unstable and tend to be decomposed by heating and/or severe physical stress, it has been necessary to use relatively expensive apparatus and techniques to separate slushy adducts from unreacted liquid hydrocarbons and purify them without undue loss of materials.

This invention is directed to an improved, more efficient and economical process based on this general separation concept whereby higher boiling n-paraffins can be extracted in highly pure form from kerosene, gas oil, wax distillates and similar petroleum fractions or products. The invention is based upon a series of operating steps which complement each other in a manner rendering the basic urea extraction technique quite commercially practicable and efficient.

The invention is predicated in part on a novel technique of reacting n-paraffins and urea or a similar complex-forming agent to produce adducts which are hard and crystalline, in contrast to adducts which are slushy or slurry-like in nature. These hard adducts are then subjected to a series of purification steps whereby they are washed of residual non-normal paraffins, but by which they are not caused to lose their hard crystalline character. By reason of their solid physical state, the separation of these adducts from the fluids with which they are admixed is rendered economical and efficient, and can be effected in a fixed bed system, whereby a single reactor vessel can be used for reaction, purification, and recovery of the n-paraffins. The economics of this system are excellent, largely because of the simplification of the purification and separation operations.

In accordance with a preferred embodiment of the present process, urea in finely divided form is disposed in a fixed bed reactor and is contacted with the mixture from which the n-paraffins are to be extracted, which may be kerosene, gas oil or wax distillates, in the presence of a non-polar compound which is a solvent for hydrocarbons, for example pentane, and a semi-polar compound, for example acetone. In the presence of both pentane and acetone, or their equivalents, the urea is activated in some manner not fully understood, and the formation of hard, crystalline adducts is greatly promoted or catalysed, and takes place quickly and efficiently. Moreover, unreacted urea is kept in finely divided solid form whereby it can more readily be recovered for reuse.

The purpose of the non-polar solvent is to dissolve the n-paraffin containing charge and thereby reduce its viscosity, so that the n-paraffinic portion thereof will wet the urea particles more thoroughly and thereby promote the formation of adducts. Pentane is preferred as the non-polar solvent because it is a solvent for the majority, if not all, of the hydrocarbons present in the reactor, is abundantly and cheaply available in most refineries, is liquid at preferred reactor conditions, and can readily be fractionated from higher boiling n-paraffins and other compounds at subsequent stages of the process for recovery and reuse. Pentane normally itself comprises a mixture of several isomers, most of which are branched. The isopentanes and normal pentanes do not form adducts with urea. The amount of non-polar solvent used in the reaction mixture is not critical, but should preferably be a proportion sufficient to promote adduct formation by lowering the viscosity of the charge yet which is not so large as to unduly dilute the charge.

In general, the quantity of urea should be considerably in excess of the amount necessary for complete reaction with the n-paraffins present in the input charge, preferably about three parts urea to each part n-paraffins in the charge. The proportion of the semi-polar compound should preferably be about three times the proportion of n-paraffins containing charge stock. In addition, there will also be present in the reactor the aromatic, olefinic, naphthenic, isoparaffinic and/or other constituents of the input stock from which the n-paraffins are to be extracted, in concentrations which will depend on the nature of the charge.

The reaction mixture is intimately commingled at conditions effective to cause the formation of hard, crystalline adducts. Preferably this is accomplished by circulating the liquid mixture through the reactor while maintaining a temperature of about 30–120° F., for a period sufficient to cause all of the n-paraffins of the charge to form adducts with the urea, time and temperature being interrelated in this regard. At a temperature of about 70° F., which is preferred, reaction is complete in about 15 minutes.

Following the formation of the adducts they are purified or washed of unreacted or non-straight chain components of the mixture in the reactor. As previously discussed, this has been found difficult to accomplish economically in commercial practice where the adducts are semi-solid or slushy. The adducts formed in accordance with the present process however are hard and crystalline and can be handled as solids with the unreacted urea while the liquid materials are drained or washed from the reactor.

In the purification operation of the present process the unreacted liquids are purged from the solids in the reactor preferably by a low boiling hydrocarbon gas, e.g. LPG or propane. The solid adduct-unreacted urea mixture, which is retained in the reactor by a filter, is washed with a non-polar solvent for hydrocarbons, again preferably pentane, to dissolve and remove any impurities absorbed on the urea or adducts. Preferably three consecutive washes are employed each in the amount of about two parts pentane to each part normal paraffin present in the adducts. After each wash the reactor is purged of substantially all liquids.

The adducts are then decomposed in the reactor to yield urea and n-paraffins. This is best effected by adding a non-polar solvent for hydrocarbons, preferably pentane, to the reactor, heating to about 200° F. under sufficient pressure to maintain the pentane in a liquid state, for example about 85 p.s.i.g., and concurrently agitating the adduct-urea-solvent mixture by circulating the heated solvent through the reactor until the adducts are decomposed.

As the adducts decompose, they yield finely divided urea crystals and essentially pure normal paraffins, which are dissolved by the pentane solvent. The liquids are purged from the reactor, and the pentane or other solvent is fractionated therefrom. The heavy boiling fraction thereby produced is substantially pure and, depending on the nature of the particular n-paraffin containing charge selected, comprises a mixture roughly of $C_{11}$–$C_{16}$ normal paraffins.

The drawing is a diagrammatic illustration of a preferred process in accordance with the invention.

Following is a description of a specific example of the preferred process illustrated in the drawing for recovering normal $C_{11}$–$C_{16}$ paraffins from a kerosene stock boiling in the range of about 300–550° F.

A fixed bed reactor 10 is charged with urea in finely divided granular form through a manway 11. The reactor 10 is provided with a filter, not shown, at its lower end for retaining solids while liquids are discharged therethrough.

Air is purged from the process equipment with a light petroleum gas, for example propane, which is introduced into the reactor 10 through lines 12 and 13. Following this the urea in the reactor is prewetted with pentane or a similar non-polar compound which is a solvent for hydrocarbons and which is delivered from a tank 14 through lines 15 and 16, whereby the surface of the particulate urea is activated so that it will more readily enter into the formation of adducts with normal paraffins. As previously explained, pentane is preferred for this purpose since it is readily available in most refineries and is low boiling and easily recovered.

The urea in the reactor is then admixed with the hydrocarbon mixture containing the n-paraffins which are to be extracted, which in this example is a kerosene stock boiling in the range of about 300° F. to about 550° F., which is introduced into the reactor through lines 17 and 13. The charge is preferably added in the amount of one part normal paraffins to each three parts urea in the reactor. Concurrently, pentane from tank 14 is added to the reactor through lines 15 and 16, together with acetone from tank 18 which is delivered to the reactor through lines 19 and 16. As previously noted, it is preferred that the resultant mixture in the reactor comprises roughly three parts urea, one part normal paraffins to be extracted, three times as much acetone as the total paraffin bearing charge stock and such quantity of pentane as is required for efficient contact of the paraffins and the urea.

The contents of the reactor are thoroughly mixed by circulating the liquid portion thereof with a pump 20, and are maintained at a temperature in the range of about 30–120° F., preferably 70° F., for a period sufficient to permit the urea to react substantially completely with the n-paraffins. At 70° F. this will require about 15 minutes. The mixture can be heated or cooled as appropriate in a heat-exchanger 35.

When the formation of adducts is substantially complete, the unreacted portion of the kerosene charge together with the acetone and pentanes are purged from the reactor 10 through line 21 by LPG introduced through lines 12 and 13. The adducts and unreacted urea are retained in the reactor by conventional filter means at the lower end of the reactor, which are not shown.

The unreacted liquid stream from the reactor is directed from line 21 through line 24, to a conventional chiller 22 and settler 23 wherein any residual or entrained urea particles are recovered for subsequent reuse in the process. Because the urea and adducts are in hard crystalline form during the reaction, separation and purification steps, they can readily be separated from the unreacted liquid, and very nearly all of the urea is recovered for reuse, in contrast to processes wherein either the urea or adducts or both are handled as slurries.

From settler 23 the unreacted hydrocarbons are passed through lines 25, 21, and 26 to a fractionation unit 27 wherein LPG, ammonia, and pentane are taken off as light fractions through line 28, the pentane being condensed and returned to its tank 14 through line 30. The acetone fraction is taken off as a side stream and returned to its tank 18 through line 31. A heavy cut is produced which comprises primarily isoparaffins admixed with lesser amounts of aromatics, olefins, and naphthenes, and is taken off through line 32.

The urea adducts which remain in the reactor 10 are purified with three consecutive pentane washes admitted to the reactor from tank 14 through lines 15 and 16, each wash being followed with propane or other purge delivered through lines 12 and 13. The purpose of the pentane washes is to purify the mixture in the reactor by flushing from it all unreacted higher boiling liquids which might otherwise tend to adhere to the urea particles or the adduct crystals. The number of washes is not critical, being significant only in relation to the purity of the product, more thoroughly washed adducts yielding purer n-paraffins. In general the proportion of pentane used in each wash is preferably about two parts pentane for each part n-paraffin in the urea adduct, but desired purity is again the governing factor. The three propane purges insure that substantially all the pentane used in each wash is drained from the reactor.

The effluent from the reactor following each wash is directed through lines 21 and 24 to chiller 22 and settler 23 to recover residual urea particles therein, and then to the fractionation unit 27 through lines 25, 21 and 26 to separate the pentane from higher boiling unreacted hydrocarbons and residual acetone admixed therewith.

The next step of the process involves the recovery of n-paraffins from the urea adducts in the reactor. This is accomplished in the preferred embodiment of the process by injecting about two parts pentane from tank 14 into reactor 10 for each part n-paraffin in the adducts, circulating the liquid mixture with pump 20 and heating it to a temperature of about 200° F., the mixture being heated by the heat exchanger 35 in conventional manner as it is circulated. When the liquids reach a temperature of about 200° F., and at sufficient pressure to maintain the pentane in a liquid state (85 p.s.i.g.), they are maintained at that temperature and pressure for about fifteen minutes, during which time the adducts are decomposed to yield urea and the original n-paraffins. The urea and hydrocarbons are not decomposed or adversely affected by the relatively low temperature necessary to decompose the adducts. The urea formed is essentially free of hydrocarbons and is in a very highly divided state. In general the adducts are destroyed by the combination of heat, the physical strain of circulation, and the preferential hydrocarbon solvent (pentane in this instance), and other combinations of these factors, which will effect decomposition of the adducts are contemplated.

The liquid product is purged from the reactor 10 with LPG, the urea being retained by the filter, and is passed first to the cooler 22 and settler 23 wherein residual urea is recovered, and then through lines 25, 21 and 36 to a separate fractionation system 37 wherein ammonia, LPG and pentane are fractionated off as light products. The pentane is returned to its tank 14 through line 38. The bottoms product from fractionation unit 37 is taken off through line 40 and comprises highly pure n-paraffins having from about eleven to sixteen carbon atoms per molecule.

The residual n-paraffins in the reactor are removed by two pentane washes. In the first wash, preferably one part pentane heated to a temperature of about 200° F. is used to each part urea, and in the second wash one part of preheated pentane is used for each part urea. The effluent from these washings is directed to the n-paraffin recovery system 37 and fractionated. After the reactor is purged again with propane, the reactor is ready for succeeding cycles of operation.

In the foregoing example the process has been described in the relation to the recovery of n-paraffins boiling in the kerosene range. The present process is also adapted for the recovery of n-paraffins from other charge stocks, for example, light or heavy gas oil or wax distillates.

We claim:

1. A fixed bed process for separating n-paraffins having approximately 11 to 16 carbon atoms per molecule from a hydrocarbon stock containing the same, said process comprising continuously maintaining a fixed bed of particle-form urea while carrying out the steps of contacting said stock with said fixed bed of urea in the approximate ratio of three parts urea to each part of said n-paraffins present in said stock, at a temperature of about 30–120° F., in the presence of about three parts acetone to each part of said stock and an amount of pentane sufficient to effect thorough wetting contact between said urea and said stock, whereby said n-paraffins form hard, crystalline adducts with said urea in said bed, purging said acetone, pentane and the remainder of unreacted stock from said bed and adducts in said bed with a low boiling hydrocarbon gas, washing said adducts in said bed with pentane and thereafter purging the pentane from said adducts with a low boiling hydrocarbon gas, regenerating said fixed bed of urea in situ by circulating preheated pentane through said bed at about 200° F. and at pressure sufficient to maintain said pentane in the liquid phase, whereby said adducts are decomposed to liberate particle-form urea and said n-paraffins, said n-paraffins being dissolved by said pentane and removed therewith from said bed, and recovering said n-paraffins from said pentane.

2. A process in accordance with claim 1 wherein said stock is a liquid petroleum fraction boiling above about 300° F.

3. A fixed bed process for separating n-paraffins having approximately 11 to 16 carbon atoms per molecule from a liquid hydrocarbon stock containing the same, said process comprising continuously maintaining a fixed bed of particle-form urea while carrying out the steps of pre-wetting said fixed bed of finely divided urea with pentane, thereby activating said urea for the subsequent formation of adducts, contacting said stock with said bed in the approximate ratio of three parts urea to each part of said n-paraffins present in said stock, at a temperature in the range of about 30–120° F., in the presence of about three parts acetone to each part of said stock and an amount of pentane sufficient to effect thorough wetting contact between urea and said stock, circulating the liquid mixture of said stock, pentane and acetone through said bed for a period sufficient for said urea to react completely with said n-paraffins, said n-paraffins thereby forming hard, crystalline adducts with said urea in said bed, purging said acetone, pentane and the remainder of the unreacted stock from said bed and adducts with a low boiling hydrocarbon gas, washing said adducts with pentane a plurality of times and purging the pentane from said adducts after each wash with a low boiling hydrocarbon gas, regenerating said fixed bed of urea in situ by circulating heated pentane through said bed at about 200° F. and at pressure sufficient to maintain said pentane in the liquid phase, whereby said adducts are decomposed to liberate particle-form urea and said n-paraffins, said n-paraffins being dissolved by said pentane and removed therewith from said bed, and recovering said n-paraffins from said pentane.

4. The process of claim 3 wherein said urea is reacted with said n-paraffins at a temperature of about 70° F. for a period of about 15 minutes.

5. The process of claim 3 wherein three pentane washing steps are used, the proportion of pentane in each said washing being about twice the parts of n-paraffin present in the adducts.

References Cited by the Examiner

UNITED STATES PATENTS

| 2,588,602 | 3/52 | Adams et al. | |
| 2,606,214 | 8/52 | Higley et al. | 260—96.5 |
| 2,716,113 | 8/55 | Axe | 260—96.5 |
| 2,723,220 | 11/55 | Axe | 260—96.5 X |
| 2,872,409 | 2/59 | Franz et al. | 260—96.5 |
| 2,912,426 | 11/59 | Karr | 260—96.5 |

FOREIGN PATENTS 728,581   4/55   Great Britain.

IRVING MARCUS, *Primary Examiner.*

A. D. SULLIVAN, NICHOLAS S. RIZZO, *Examiners.*